(12) United States Patent
Hiyama et al.

(10) Patent No.: US 9,031,862 B2
(45) Date of Patent: May 12, 2015

(54) ADVERTISEMENT DELIVERY TARGET IDENTIFYING APPARATUS, ADVERTISEMENT DELIVERY APPARATUS, ADVERTISEMENT DELIVERY TARGET IDENTIFYING METHOD, ADVERTISEMENT DELIVERY METHOD, PROGRAM, AND RECORDING MEDIUM

(75) Inventors: Yuriko Hiyama, Minato-ku (JP); Tomoyuki Oosaka, Minato-ku (JP); Kazuya Ueki, Koto-ku (JP)

(73) Assignee: NEC Solution Innovators, Ltd., Tokyo (JP)

( * ) Notice: Subject to any disclaimer, the term of this patent is extended or adjusted under 35 U.S.C. 154(b) by 88 days.

(21) Appl. No.: 13/824,361

(22) PCT Filed: Sep. 20, 2011

(86) PCT No.: PCT/JP2011/071307
§ 371 (c)(1),
(2), (4) Date: Mar. 16, 2013

(87) PCT Pub. No.: WO2012/043291
PCT Pub. Date: Apr. 5, 2012

(65) Prior Publication Data
US 2013/0198003 A1 Aug. 1, 2013

(30) Foreign Application Priority Data
Sep. 30, 2010 (JP) ................. 2010-222361

(51) Int. Cl.
*G06Q 30/00* (2012.01)
*G06Q 30/02* (2012.01)
(Continued)

(52) U.S. Cl.
CPC ........ *G06Q 30/0261* (2013.01); *G06Q 30/0251* (2013.01); *G09F 19/00* (2013.01);
(Continued)

(58) Field of Classification Search
CPC .................................................. G06Q 30/0251
USPC ....................................................... 705/14.49
See application file for complete search history.

(56) References Cited

U.S. PATENT DOCUMENTS

| 2003/0004743 A1* | 1/2003 | Callegari .......................... 705/1 |
| 2005/0197923 A1 | 9/2005 | Kilner et al. |

(Continued)

FOREIGN PATENT DOCUMENTS

| JP | 2002-269290 A | 9/2002 |
| JP | 2005-251170 A | 9/2005 |

(Continued)

*Primary Examiner* — John G Weiss
*Assistant Examiner* — Scott C Anderson
(74) *Attorney, Agent, or Firm* — Sughrue Mion, PLLC

(57) ABSTRACT

The present invention is to provide an advertisement delivery target identifying apparatus, an advertisement delivery apparatus, an advertisement delivery target identifying method, an advertisement delivery method, a program, and a recording medium that allow an advertisement effect to be increased by identifying an advertisement delivery target.

An advertisement delivery target identifying apparatus includes:
an image acquiring unit of acquiring an image of a person present within and outside of a visible range of an advertisement;
an expected moving range calculating unit of calculating an expected moving range in future of the person from the image;
a score calculating unit of calculating a score based on a relationship between the visible range of an advertisement and the calculated expected moving range; and
an advertisement delivery target identifying unit of identifying a person to be a target of an advertisement to be delivered based on the calculated score.

12 Claims, 13 Drawing Sheets

(51) Int. Cl.
　　　*G09F 19/00*　　　　　(2006.01)
　　　*G09F 27/00*　　　　　(2006.01)
　　　*G06T 7/20*　　　　　　(2006.01)
(52) U.S. Cl.
　　　CPC ........... *G09F 27/00* (2013.01); *G06Q 30/0269*
　　　　　　(2013.01); *G06T 7/2033* (2013.01); *G06T*
　　　　　　*2207/10016* (2013.01); *G06T 2207/10024*
　　　　　　(2013.01); *G06T 2207/20021* (2013.01); *G06T*
　　　　　　*2207/30196* (2013.01); *G06T 2207/30201*
　　　　　　　　　　　　　　　　　　　　　　　(2013.01)

(56) References Cited

U.S. PATENT DOCUMENTS

2007/0273583 A1\* 11/2007 Rosenberg ................ 342/367
2008/0172781 A1　　7/2008 Popowich et al.

FOREIGN PATENT DOCUMENTS

| JP | 2008-112401 A | 5/2008 |
| JP | 2010-39333 A | 2/2010 |

\* cited by examiner 3 to 7-year-old 20-year-old

ADVERTISEMENT DELIVERY TARGET IDENTIFYING APPARATUS, ADVERTISEMENT DELIVERY APPARATUS, ADVERTISEMENT DELIVERY TARGET IDENTIFYING METHOD, ADVERTISEMENT DELIVERY METHOD, PROGRAM, AND RECORDING MEDIUM

CROSS REFERENCE TO RELATED APPLICATIONS

This application is a National Stage of International Application No. PCT/JP2011/071307, filed on Sep. 20, 2011, which claims priority from Japanese Patent Application No. 2010-222361, filed on Sep. 30, 2010, the contents of all of which are incorporated herein by reference in their entirety.

TECHNICAL FIELD

The present invention relates to an advertisement delivery target identifying apparatus, an advertisement delivery apparatus, an advertisement delivery target identifying method, an advertisement delivery method, a program, and a recording medium.

BACKGROUND ART

In these days, in response to the diversification of advertisement styles, for example, an electronic advertisement for showing an advertisement on a large-screen display at a site where many people are gathered such as a station yard comes into widespread use. The electronic advertisement generally switches the advertisement to be delivered. For example, by installing a camera to an electronic advertisement delivery apparatus and detecting a person passing in front of the electronic advertisement delivery apparatus, the advertisement to be delivered is switched every time a person passes in front of the electronic advertisement delivery apparatus. For the switching of the advertisement to be delivered, there is a display system of detecting the facial image of the person from the image shot by the camera directed to the location of a person watching the screen of the electronic advertisement delivery apparatus, estimating the gender, age, and the like of the person, and displaying an image matching the estimated gender, age, and the like (for example, see Patent Document 1).

RELATED ART DOCUMENT

Patent Document

[Patent Document 1] JP2005-251170A

SUMMARY OF INVENTION

Problem to be Solved by the Invention

With a conventional electronic advertisement, there has been a case of identifying a person who should not be identified as a delivery target in a case where a number of persons are present in the image shot, a case in which a person in the image is not in a status of watching a screen, and the like. Therefore, an advertisement cannot be delivered to a target to whom the advertisement should be delivered, and it cannot be said that the advertisement effect is sufficient. Hence, the present invention is intended to provide an advertisement delivery target identifying apparatus, an advertisement delivery apparatus, an advertisement delivery target identifying method, an advertisement delivery method, a program, and a recording medium that allow an advertisement effect to be increased by identifying an advertisement delivery target.

Means for Solving Problem

In order to achieve the aforementioned object, the advertisement delivery target identifying apparatus of the present invention includes:
an image acquiring unit of acquiring an image of a person present within and outside of a visible range of an advertisement;
an expected moving range calculating unit of calculating an expected moving range in future of the person from the image;
a score calculating unit of calculating a score based on a relationship between the visible range of an advertisement and the calculated expected moving range; and
an advertisement delivery target identifying unit of identifying a person to be a target of an advertisement to be delivered based on the calculated score.

The advertisement delivery apparatus of the present invention includes:
an advertisement delivery target identifying unit; and
an advertisement delivery unit, wherein
the advertisement delivery unit selects an advertisement to be delivered according to an attribute of an advertisement delivery target identified by the advertisement delivery target identifying unit, and
the advertisement delivery target identifying unit is the advertisement delivery target identifying apparatus of the present invention.

The advertisement delivery target identifying method of the present invention includes:
an image acquiring step of acquiring an image of a person present within and outside of a visible range of an advertisement;
an expected moving range calculating step of calculating an expected moving range in future of the person from the image;
a score calculating step of calculating a score based on a relationship between the visible range of an advertisement and the calculated expected moving range; and
an advertisement delivery target identifying step of identifying a person to be a target of an advertisement to be delivered based on the calculated score.

The advertisement delivery method of the present invention includes:
an advertisement delivery target identifying step; and
an advertisement delivery step, wherein
in the advertisement delivery step, an advertisement to be delivered is selected according to an attribute of an advertisement delivery target identified in the advertisement delivery target identifying step, and
the advertisement delivery target identifying step uses the advertisement delivery target identifying method of the present invention.

The program of the present invention causes a computer to execute the advertisement delivery target identifying method of the present invention or the advertisement delivery method of the present invention.

The recording medium of the present invention is recorded with the program of the present invention.

Effects of the Invention

The present invention can provide an advertisement delivery target identifying apparatus, an advertisement delivery apparatus, an advertisement delivery target identifying method, an advertisement delivery method, a program, and a recording medium that allow an advertisement effect to be increased by identifying an advertisement delivery target.

DESCRIPTION OF EXEMPLARY EMBODIMENT

In the advertisement delivery target identifying apparatus of the present invention, preferably, the expected moving range calculating means (unit) calculates an expected moving range in future based on location information of the person, traveling information of the person, and attribute information of the person.

In the advertisement delivery target identifying apparatus of the present invention, preferably, the score calculating means (unit) calculates the score by taking environmental information of the visible range into consideration.

In the advertisement delivery target identifying apparatus of the present invention, preferably, the score calculating means calculates the score by assigning weights to the person.

In the advertisement delivery target identifying apparatus of the present invention, preferably, the expected moving range calculating means includes forming means (unit) of a grid map of the person.

Hereinafter, the advertisement delivery target identifying apparatus, the advertisement delivery apparatus, the adver-tisement delivery target identifying method, and the advertisement delivery method of the present invention will be described in detail. However, the present invention is not limited to the following exemplary embodiments. Note here that, in the following FIGS. 1 to 14, identical parts are indicated with identical numerals and symbols.

Exemplary Embodiment 1

Figure 1A:
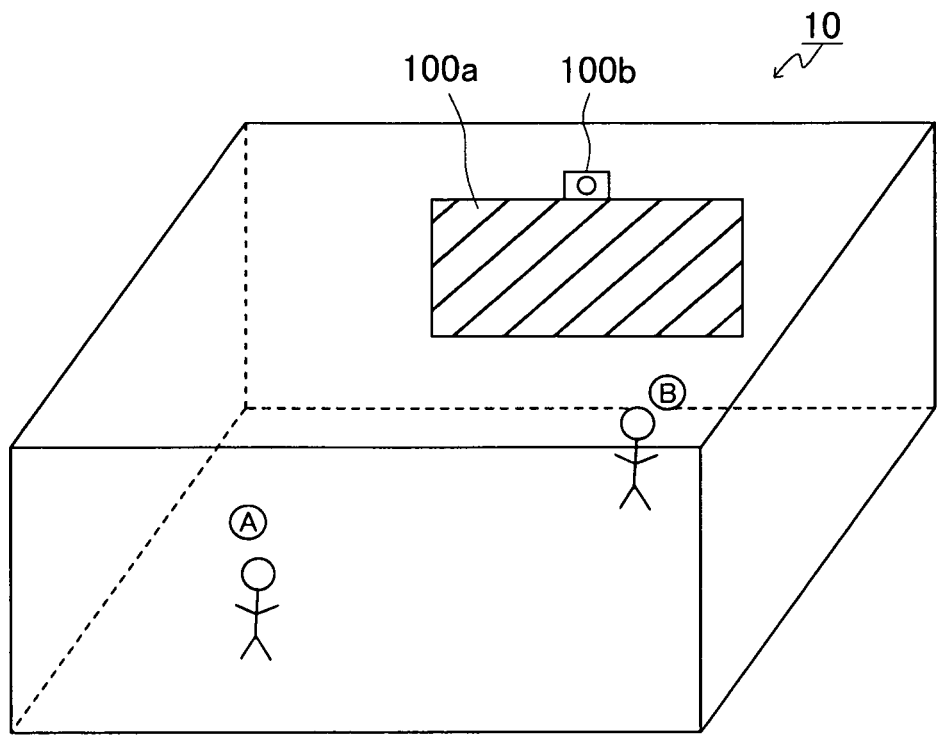
FIGS. 1A and 1B are views for explaining the visible range of an advertisement.
Figure 1B:
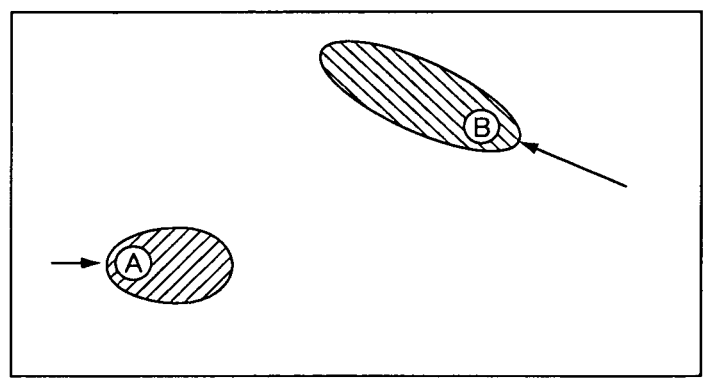

FIGS. 1A and 1B are views for explaining the concept of an advertisement delivery target identifying apparatus 10 of a first exemplary embodiment. FIG. 1A is a view of the advertisement delivery target identifying apparatus in a state where an electronic advertisement delivery apparatus (advertisement delivery apparatus) is provided on an external wall or the like. In the first exemplary embodiment, a display 100a having a large screen and a camera 100b that form the electronic advertisement delivery apparatus are provided outside of the external wall. The space enclosed in the lines of a rectangular parallelepiped shows the visible range (space) of an advertisement. The visible range can be defined for each site where the display is provided in consideration of the size of a display, the presence or absence of an obstacle such as a roof, the location of a roadway, and the like. Within the visible range, in general, a number of persons can pass or stop. FIG. 1A representatively shows a state where two persons, A and B, are present within the visible range. The person A walks slowly at a site distanced from the display 100a (site from which the display 100a is hardly seen) and the person B walks quickly at a site relatively close to the display 100a (site from which the display 100a can be seen well). Both the persons, A and B, are in the state where image information is acquired by the camera 100b. FIG. 1B is an overhead view showing the movement of the persons, A and B. Each of the arrows in FIG. 1B shows the direction and speed of each person. Note here that a longer arrow refers to a faster moving speed. In FIG. 1B, each of the diagonally shaded areas is a range of an expected moving location in future of each person. The present invention is characterized by determining a person who is effective as a target of an advertisement to be delivered, for example, in the case where a number of persons are within the visible range of an advertisement or possibly come into the visible range of an advertisement. Hereinafter, the first exemplary embodiment will be described with a block diagram of the advertisement delivery target identifying apparatus and a flowchart showing the procedure performed by the advertisement delivery target identifying apparatus.

Figure 2:
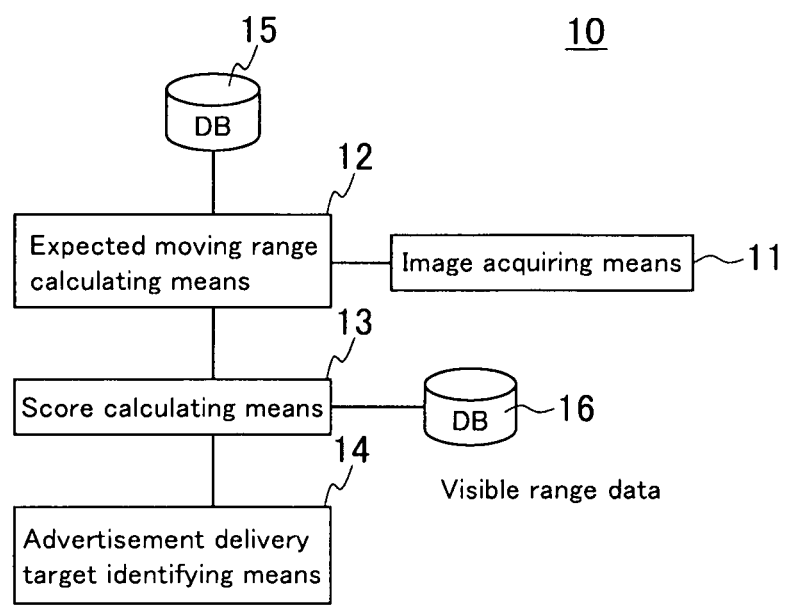
FIG. 2 is a block diagram showing the configuration of a first exemplary embodiment of the advertisement delivery target identifying apparatus of the present invention.
Figure 3:
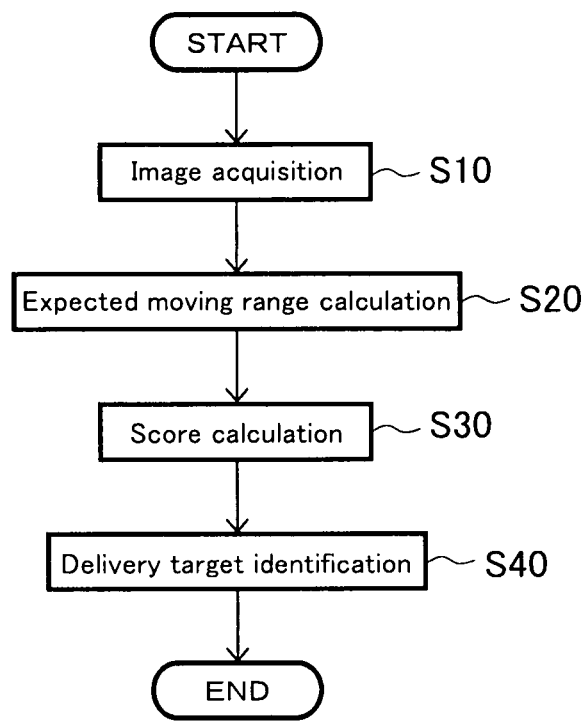
FIG. 3 is a flowchart showing the procedure performed by the advertisement delivery target identifying apparatus of the first exemplary embodiment of the present invention.

FIG. 2 is a block diagram showing the configuration of the advertisement delivery target identifying apparatus of the first exemplary embodiment. FIG. 3 is a flowchart of the advertisement delivery target identifying method of the first exemplary embodiment. As shown in FIG. 2, the advertisement delivery target identifying apparatus 10 of the first exemplary embodiment includes image acquiring means (unit) 11, expected moving range calculating means (unit) 12, score calculating means (unit) 13, advertisement delivery target identifying means (unit) 14, an attribute information database 15, and a score calculation information database 16. The image acquiring means 11 is connected to the expected moving range calculating means 12. The expected moving range calculating means 12 is connected to the score calculating means 13. The score calculating means 13 is connected to the advertisement delivery target identifying means 14. Further, the expected moving range calculating means 12 is connected to the attribute information database 15. The score calculating means 13 is connected to the score calculation information database 16. The advertisement delivery target identifying apparatus of the first exemplary embodiment preferably includes output means as an optional component.

With respect to each of the components such as the image acquiring means 11, the expected moving range calculating means 12, the score calculating means 13, and the advertisement delivery target identifying means 14, FIG. 2 does not show the configuration in a unit of hardware but shows the block in a functional unit. Each of the components of the advertisement delivery target identifying apparatus 10 is executed by an optional combination of hardware and software including a central processing unit (CPU) of a computer; a memory; a program for executing the components shown in FIG. 2 loaded in a memory; storage units such as a random access memory (RAM), a read-only memory (ROM), a hard disk (HD), an optical disk, and a floppy (registered trade name) disk (FD) storing the program; and an interface for network connection. There are various variations of the method and apparatus for executing the components. The attribute information database 15 and the score calculation information database 16 may be a built-in type or an external type such as an external storage device. The databases 15 and 16 may be stored in a server on the network via the interface for network connection. Examples of the output means include a monitor outputting data by an image (for example, image displays such as a liquid crystal display (LCD) and a cathode-ray tube (CRT) display) and a printer outputting data by printing.

The image acquiring means 11 acquires image information of a person present within and outside of the visible range of an advertisement (step S10). The image information includes, for example, location information and traveling information. The traveling information includes, for example, a traveling speed and a traveling direction.

The image acquiring means 11 is provided with, for example, a charge coupled device (CCD) camera, a complementary metal oxide semiconductor (CMOS) camera, and an image scanner. Preferably, the image acquiring means 11 is provided with more than one camera. This makes it possible to calculate the location information with higher accuracy by processing multiple pieces of image information respectively generated in more than one camera in connection with one another. Also, it is possible to increase the matching accuracy with the attribute information in the expected moving range calculating means that will be described later.

The traveling speed and the traveling direction of a specific person can be calculated based on, for example, the history of the location information of the person. The history of the location information of a person is stored associated with information identifying the person such as the facial feature data of the person. For example, the image acquiring means 11 also detects the facial feature data of the person when it detects the location information of the person. Then, the image acquiring means 11 searches the feature data identical to the detected facial feature data from the data stored in the image acquiring means 11. Thereafter, the image acquiring means 11 stores the newly detected location information associated with the searched feature data. By repeating this procedure, the image acquiring means 11 stores the history of the location information of the person.

Further, the information showing the history of the location information of the person may be calculated based on the parameters such as the moving distance, the comparison with a predicted location, the size of the head, the direction of the head, the commonality in clothing, the similarity in the face, the gender degree, and the age, for example, as described below. The following tracking process is performed by the image acquiring means 11. Examples of the parameter of a target data for determining the identity of a person will be described below. However, the parameter of the target data is not limited to these parameters.

<Moving Distance>

Figure 5:
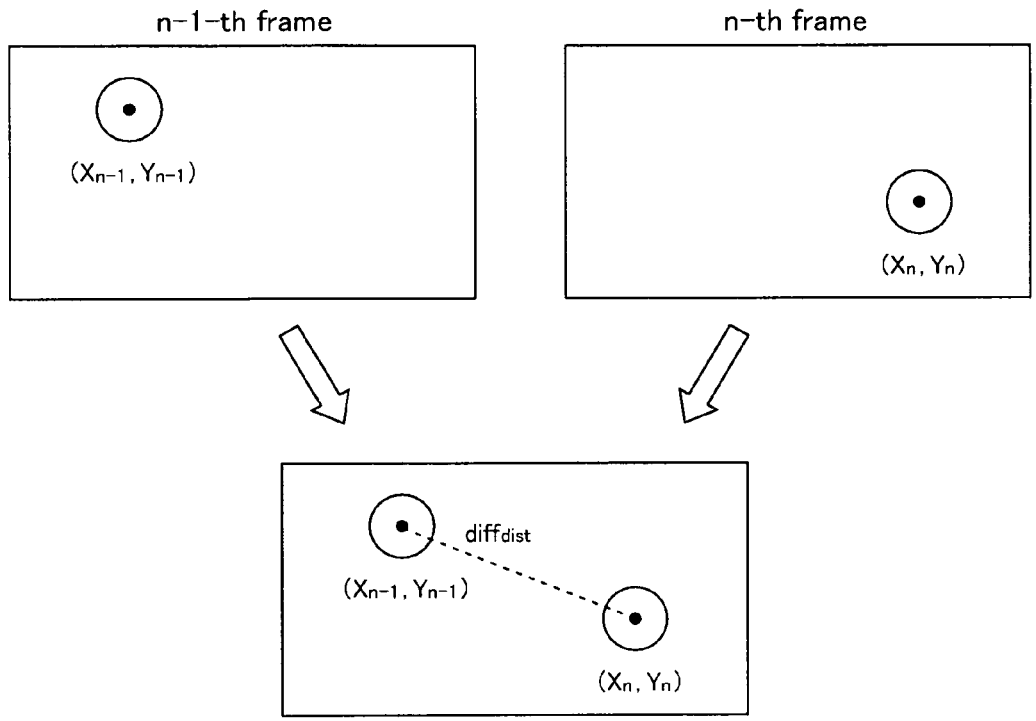
FIG. 5 is a view of explaining the moving distance of a person between frames.

Usually, the location of the same person does not change sharply between successive frames. For example, as shown in FIG. 5, when the location of a candidate in the n−1-th frame is expressed as $(X_{n-1}, Y_{n-1})$ and the location of a person in the n-th frame is expressed as $(X_n, Y_n)$, it is considered that the smaller the distance between these two points, $\text{diff}_{dist} = [(X_{n-1} - X_n)^2 + (Y_{n-1} - Y_n)^2]^{1/2}$, the higher the identity of the person.

<Comparison with Predicted Location>

It is predictable to which location a person shown in the image in a frame moves in the image in the next frame. For example, it is predictable to which location a person shown in the image in the n−1-th frame moves in the next n-th frame from the image in the n−1-th frame and the images in the n−2-th and former frames. It is considered that the shorter the distance between the location of the person in the image in the n-th frame predicted in the n−1-th frame and the actual location in the n-th frame, the higher the identity of person.

<Size of Head>

Figure 6:
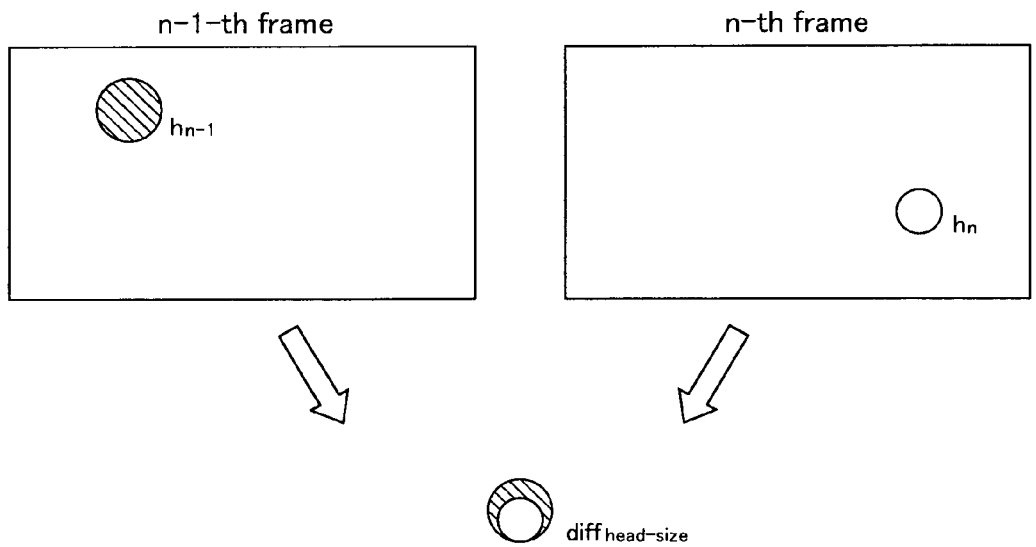
FIG. 6 is a view of explaining the difference in the size of the head of a person between frames.

Usually, the size of the head of the same person does not change sharply between successive frames. For example, as shown in FIG. 6, when the size of the head of a person in the n−1-th frame is expressed as $h_{n-1}$ and the size of the head in the n-th frame is expressed as $h_n$, it is considered that the smaller the difference between these sizes ($\text{diff}_{head\text{-}size}$), the higher the identity of person.

<Direction of Head>

Since a human being generally moves in a constant direction, it is a rare case that the direction of the head in a frame extremely differs from the direction of the head in the next frame. Therefore, by comparing the direction of the head in the n−1-th frame and the direction of the head in the n-th frame, the identity of person can be determined. It is considered that the smaller the difference between the direction of the head in the n−1-th frame and the direction of the head in the n-th frame, the higher the identity of person.

Further, it is considered that the heading direction of the head at the time of moving matches the traveling direction of the person. Therefore, by comparing the moving direction predicted based on the direction of the head in the n−1-th frame and the actual moving direction from the n−1-th frame to the n-th frame, the identity of person can be determined. It is considered that the smaller the difference between the direction of the head in the n−1-th frame and the moving direction from the n−1-th frame to n-th frame, the higher the identity of person.

<Commonality in Clothing>

The clothing of the same person does not change sharply between successive frames. Therefore, the identity of person can be determined based on the clothing of a person shown in the image in a frame. When the head of the person is detected in the image in a frame, it can be presumed that the part directly below the head is the chest of the person. Therefore, with respect to the same person, the histogram distribution of the color component in the part (chest area) directly below the head of the person in the image in a frame is substantially the same as the histogram distribution of the color component in the chest area in the image in the next frame. Accordingly, it is considered that the smaller the difference between the histogram distribution of the color component in the chest area in the n−1-th frame and the histogram distribution of the color component in the chest area in the n-th frame, the higher the identity of person.

<Similarity in Face>

The face of the same person does not change sharply between successive frames. Therefore, the identity of person can be determined based on the face of a person shown in the image in a frame. The difference of the face of the person between frames can be converted into a numerical value by template matching or the like. It is considered that the smaller the value obtained by such a method, the higher the identity of person.

<Gender Degree>

The femaleness and maleness of the face of the same person does not change sharply between successive frames. Therefore, the identity of person can be determined based on the femaleness and maleness of a person shown in the image in a frame. Here, in the case where the femaleness and maleness are defined as the gender degree, the gender degree can be outputted by a classifier based on the facial image. For example, a value closer to 0 is outputted for higher femaleness of the face of a person shown in the image in a frame, and a value closer to 1 is outputted for higher maleness of the face of a person shown in the image in a frame. In the case of outputting the gender degree in the manner described above, it is considered that the smaller the difference between the gender degree in the n–1-th frame and the gender degree in the n-th frame, the higher the identity of person.

<Age>

The age of the same person does not change sharply between successive frames. Therefore, the identity of person can be determined based on the age of a person shown in the image in a frame. The age of human can be presumed based on the facial image by a classifier dealing with continuous quantity. It is considered that the smaller the difference between the age presumed in the n–1-th frame and the age presumed in the n-th frame, the higher the identity of person.

It is possible to individually set whether or not to use the aforementioned parameters for tracking of a person. At the time of determining whether or not plural images detected among plural frames show the same person, the determination is preferably made using multiple pieces of information among the pieces of information of the aforementioned parameters. Whether or not the person shown in the image in a frame is shown in the image in the former frame can be determined, for example, by the level of the correlation between the target data. For example, in the case where a person W is detected in the image in the n-th frame and three persons A, B, and C are detected in the image in the n–1-th frame, the target data $W_n$ of the person W is compared with each of the target data $A_{n-1}$, the target data $B_{n-1}$, and the target data $C_{n-1}$ of the persons A, B, and C. Among the persons A, B, and C, the person who is determined as the person having the highest correlation with the person W is determined as the same person as the person W, and the movement of the person W between the n–1-th frame and the n-th frame is tracked.

The expected moving range calculating means 12 calculates the expected moving range in future of the person based on the image information obtained by the image acquiring means 11 (step S20). Preferably, the expected moving range calculating means 12 calculates the expected moving range in future of the person based on the location information and the traveling information of the image information and the attribute information of the person. The location information includes the aforementioned history of the location information. The attribute information of the person is acquired by matching the image information obtained by the image acquiring means 11 by referring to the attribute information database 15. The attribute information of the person includes an age, a gender, directions (front-facing, rear-facing, and the like), and information selected from past histories and the like. In the first exemplary embodiment, the attribute includes at least an age. The expected moving range calculating means 12 calculates the expected moving range by using the moving direction, preferably the moving speed of the person calculated based on the location information stored in the attribute information database 15.

Each of FIGS. 7A to 7D shows the expected moving range definition information held by the expected moving range calculating means 12. In examples shown in FIGS. 7A to 7D, the expected moving range definition information is an attribute-based grid map by an age bracket. The grid map shows the probability distribution in the area around the person. In each of the grid maps, the grid corresponding to the current location of the person shows the highest possibility of moving, and the possibility of moving decreases with the increasing distance from the current location. The rate of the possibility decrease differs according to, for example, an age bracket. That is, the expected moving range calculating means 12 changes the expected moving range according to the age bracket.

Figure 7A:
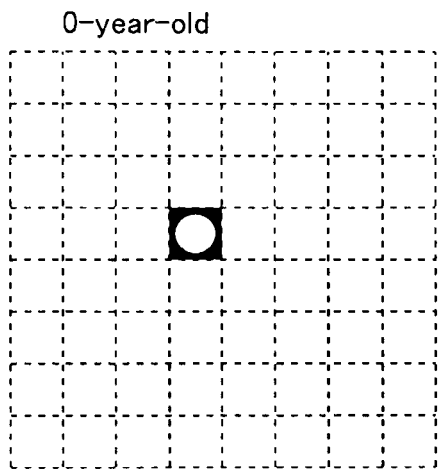
FIGS. 7A to 7D are views for showing examples of the grid map of expected moving range definition information held by the expected moving range calculating means.
Figure 7B:
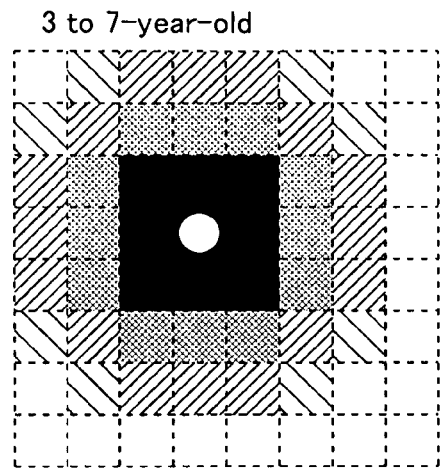

For example, in the case of 0-year-old infants as shown in FIG. 7A, since it is rare for 0-year-old infants to move by themselves, only the current location can be defined as the expected moving range. However, as shown in FIG. 7B, with respect to children not more than 10-year-old, for example, children from 3-year-old to 7-year-old, it is unpredictable to which direction they will move, and there are cases in which they suddenly change the moving direction. Therefore, there is a need to define the expected moving range widely centering the current location. That is, in the case of children not more than 10-year-old, centering the current location, the grid therearound shows a uniform probability distribution.

Figure 7C:
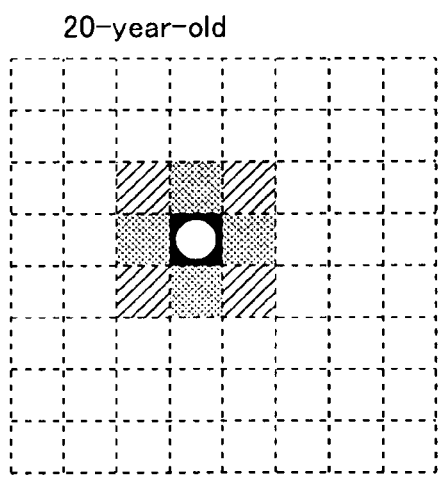
Figure 7D:
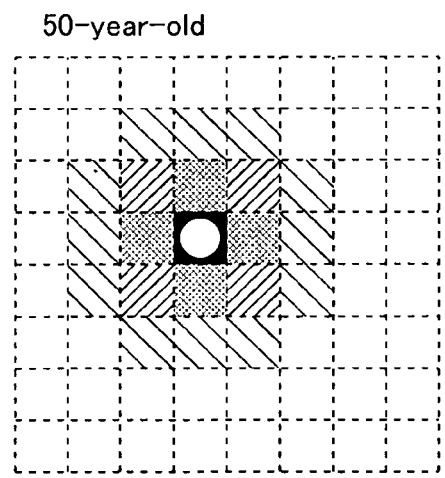

With respect to adults of not less than 20-year-old, they do not change the moving direction suddenly and they usually pay attention to surroundings. Therefore, as shown in FIG. 7C, there is no problem to define the expected moving range narrower than that of children. That is, in the case of adults of not less than 20-year-old, the moving possibility decreases rapidly to a certain degree as they leave from the current location. However, as people get older, attention tends to decrease and quickness also tends to decrease. Therefore, for example, in the case of adults of 50s, as shown in FIG. 7D, the expected moving range can be defined wider than that of adults of 20s.

Figure 8A:
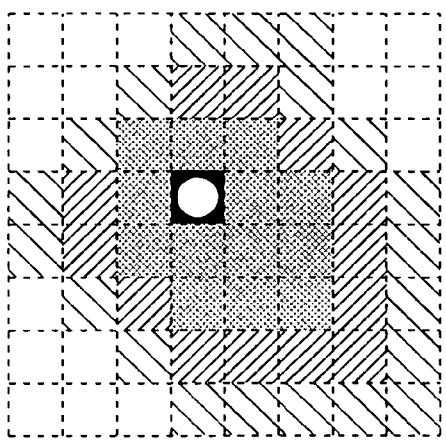
FIGS. 8A and 8B are views showing examples of the grid map obtained by incorporating traveling information into expected moving range definition information.
Figure 8B:
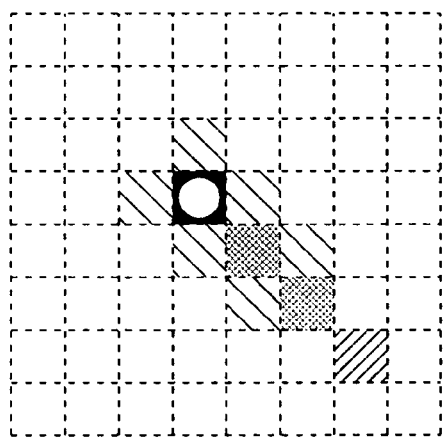

FIGS. 8A and 8B are views showing examples of the grid map obtained by incorporating traveling information of a person calculated based on the history of the location information into the attribute-based expected moving range definition information by an age bracket. In each of these grid maps, an area of high moving possibility spreads in the calculated moving direction. Even in the case where the traveling information is taken into consideration, children show an area of high moving possibility larger than that of adults.

The expected moving range calculating means 12 may store age bracket-based expected moving range information for each moving direction of a person. Further, the expected moving range calculating means 12 may store age bracket-based expected moving range information and information showing how to deform the expected moving range in response to the moving direction of a person. These pieces of information may be stored, for example, in the attribute information database 15.

The score calculating means 13 calculates a score based on the relationship between the visible range of an advertisement and the calculated expected moving range of a person (step S30). Specifically, for example, the score can be calculated based on the size of an overlapped area of the obtained grid map and the visible range. Information relating to the visible range may be stored in the score calculation information database 16. In this case, the score calculating means 13 calculates a score by referring to the data stored in the score calculation information database 16.

The advertisement delivery target identifying means 14 selects the highest score from plural scores each calculated for each person whose image is acquired. Then, the person with the highest score is identified as an advertisement delivery target (step S40). It can be determined that a person with a high score has a good chance of being interested in an advertisement image based on the moving pattern shown in the expected moving range and the attributes.

Figure 4:
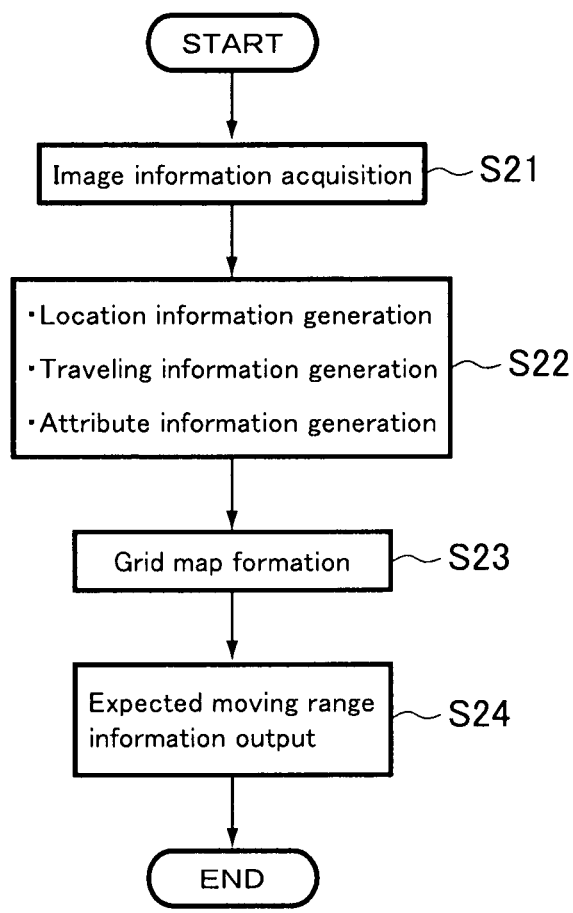
FIG. 4 is a flowchart showing details of the procedure of the expected moving range calculating step shown in FIG. 3.

FIG. 4 is an example of a flowchart showing details of the step 20 of the expected moving range calculation shown in FIG. 3. First, the expected moving range calculating means 12 acquires the image information acquired by the image acquiring means 11 (step S21). On the basis of the acquired image information, by referring to the attribute information database 15, location information, traveling information, and attribute information of a person whose image is acquired are generated (step S22). Further, a grid map is formed based on the generated information (step S23). Then, the grid map is sent to the score calculating means 13 as the expected moving range information (step S24). For example, in a case where moving direction information and age bracket information of a person are generated in step S22, the expected moving range calculating means 12 calculates the expected moving range using the moving direction and age bracket of a person. In step S22, in a case where the moving speed is also calculated, the expected moving range calculating means 12 calculates the expected moving range using the moving direction, moving speed, and age bracket of a person.

Note here that, in the first exemplary embodiment, the expected moving range calculating means 12 may define the expected moving range not using attributes of a person but only using the moving direction (preferably, moving speed).

Exemplary Embodiment 2

Figure 9A:
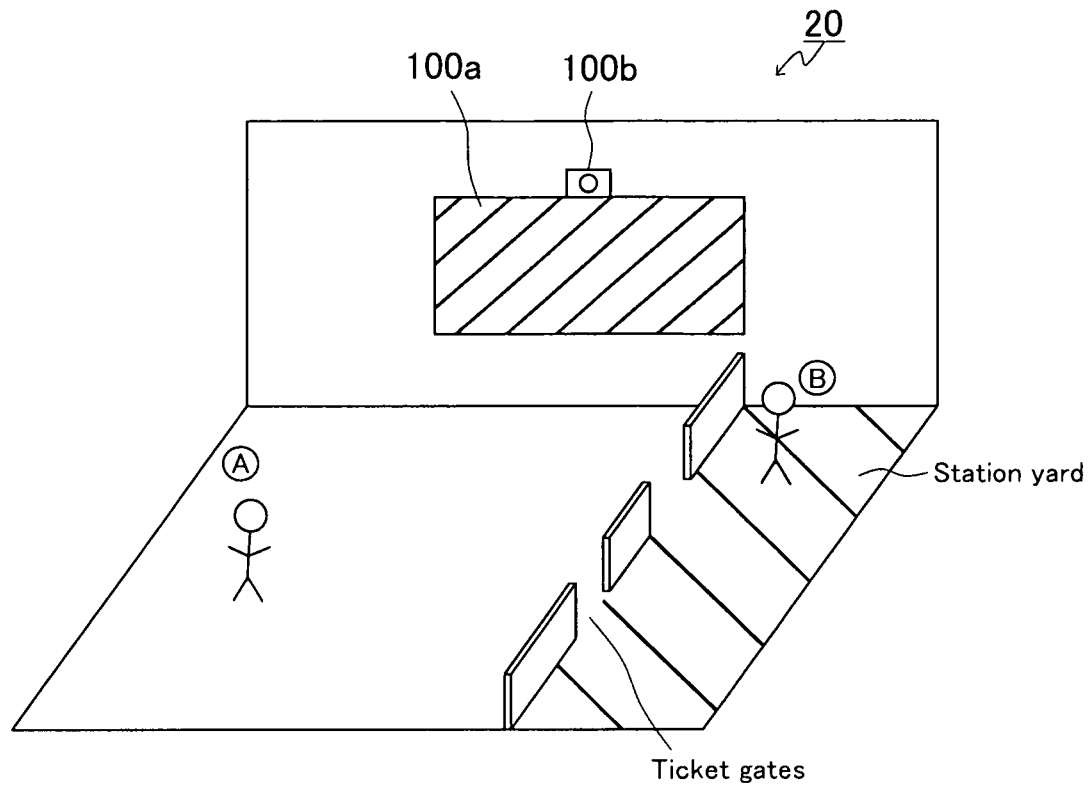
FIGS. 9A and 9B are views for explaining the visible range of an advertisement in a second exemplary embodiment.
Figure 9B:
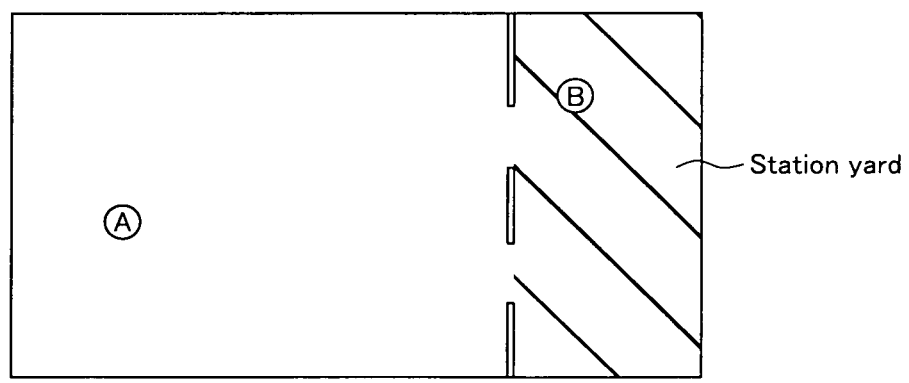

A second exemplary embodiment is an exemplary embodiment in which the score calculating means calculates a score by taking environmental information of the visible range into consideration. FIGS. 9A and 9B are views for explaining the concept of an advertisement delivery target identifying apparatus 20 according to the second exemplary embodiment. FIG. 9A is a view of the advertisement delivery target identifying apparatus in a state where an electronic advertisement delivery apparatus (advertisement delivery apparatus) is provided on an external wall or the like. FIG. 9B is an overhead view of FIG. 9A. FIG. 9A is the same as FIG. 1A except that station ticket gates are present within the visible range. The advertisement can be seen also from the station yard shown in FIG. 9A in terms of distance. However, although the image information of the person B in the station yard is acquired by a camera 100b, the person B hardly sees a display 100a with the ticket gates in the way.

Figure 10:
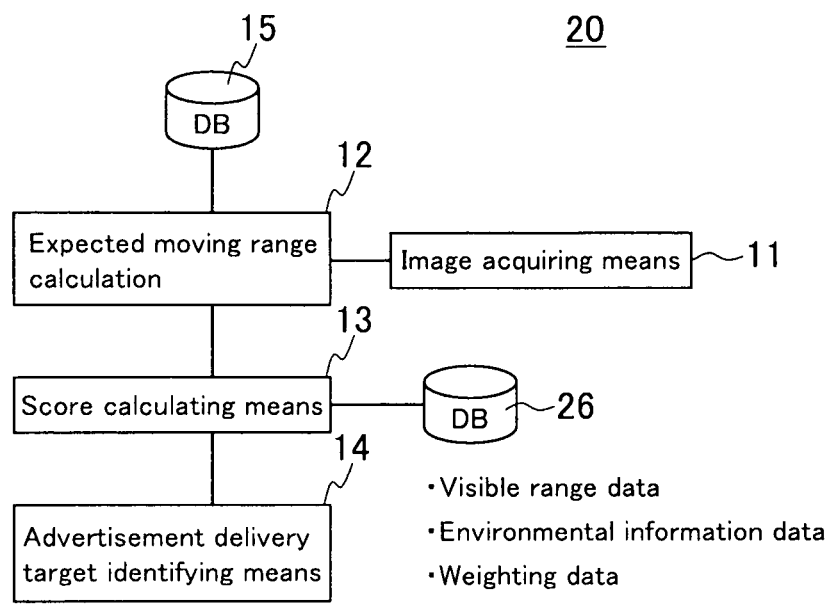
FIG. 10 is a block diagram showing the configuration of the second exemplary embodiment of the advertisement delivery target identifying apparatus of the present invention.
Figure 11:
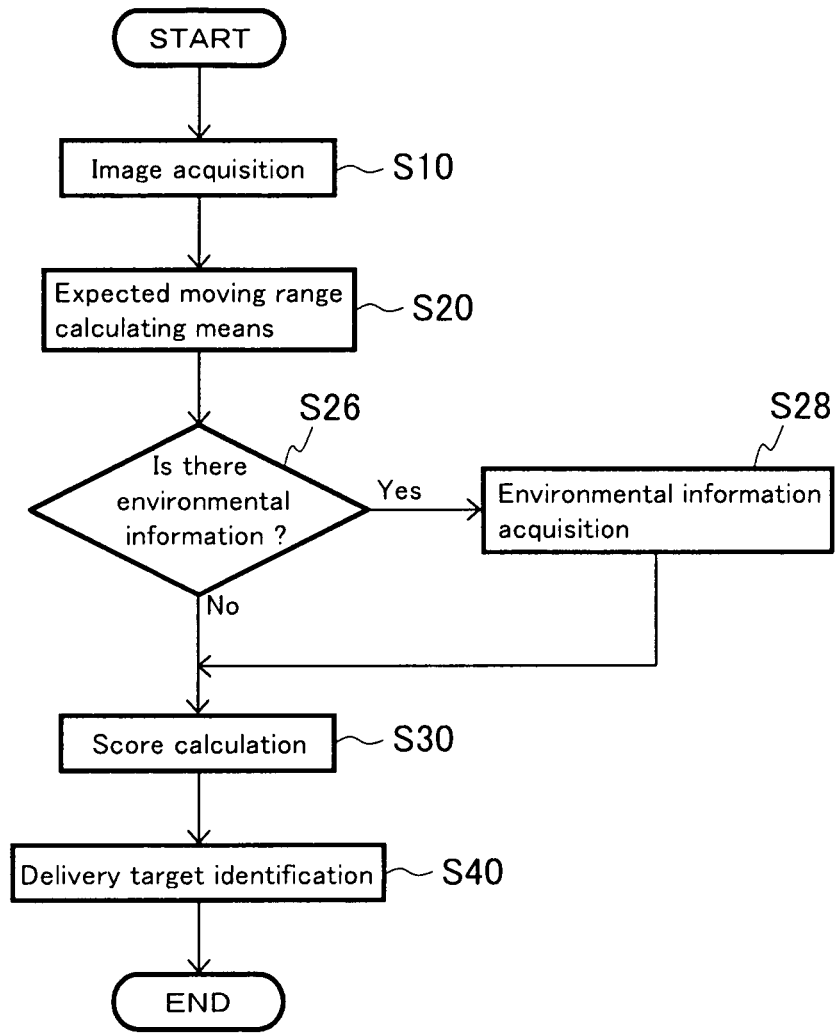
FIG. 11 is a flowchart showing the procedure performed by the advertisement delivery target identifying apparatus of the second exemplary embodiment of the present invention.

FIG. 10 is a block diagram showing the configuration of the advertisement delivery target identifying apparatus 20 of the second exemplary embodiment. FIG. 11 is a flowchart showing the advertisement delivery target identifying method of the second exemplary embodiment. The advertisement delivery target identifying apparatus 20 of the second exemplary embodiment has the same configuration as the advertisement delivery target identifying apparatus 10 of the first exemplary embodiment except that a score calculation information database 26 contains the environmental information of the visible range and the like therein. In the advertisement delivery target identifying method of the second exemplary embodiment, before calculating a score based on the relationship between the visible range of an advertisement and the calculated expected moving range of a person (step S30), if there is environmental information of the visible range (step S26: Yes), the information is acquired (step S28), and the score is calculated by taking the obtained environmental information of the visible range in consideration (step S30).

Figure 12:
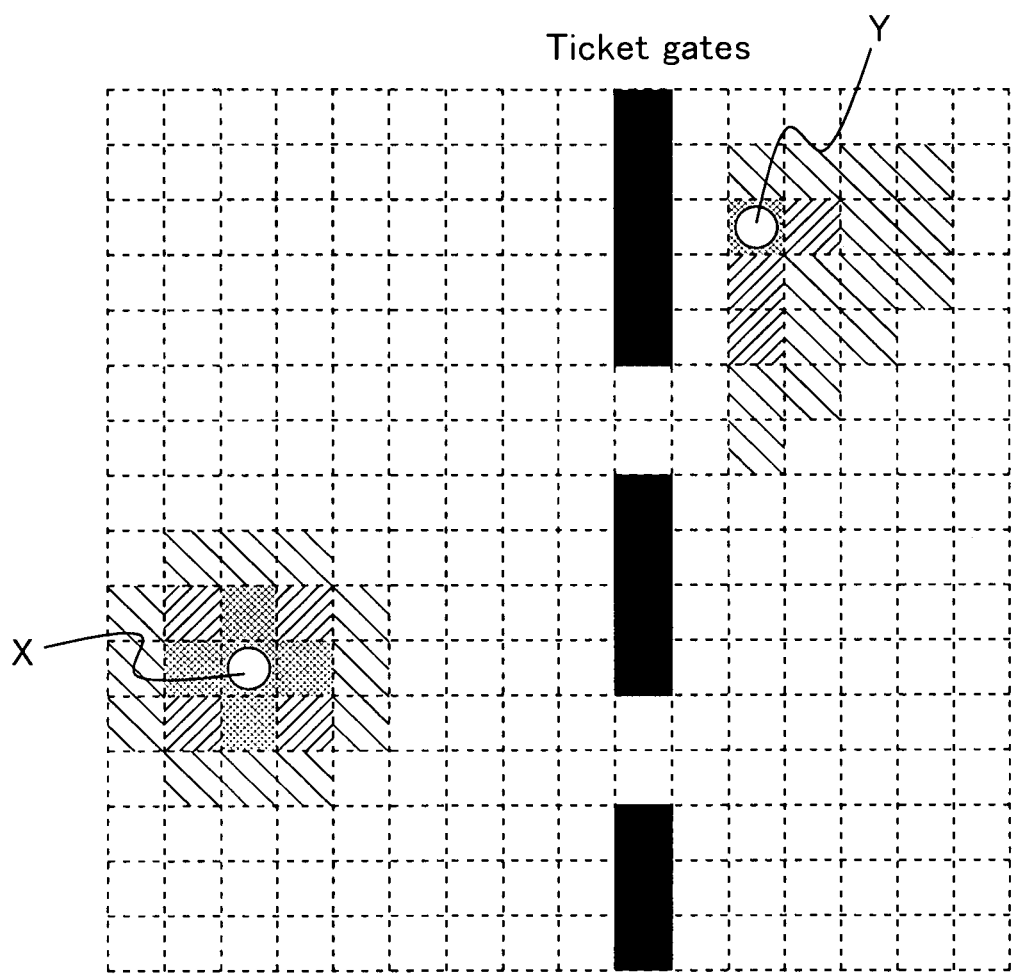
FIG. 12 is a view showing an example of the grid map obtained by incorporating environmental information into expected moving range definition information.

FIG. 12 is a view showing an example of the grid map obtained by incorporating environmental information of the visible range into the expected moving range definition information described in the first exemplary embodiment. In FIG. 12, the solidly shaded areas indicate the station ticket gates. In FIG. 12, the right side of the ticket gates is the station yard. In FIG. 12, white circles indicate persons X and Y. Here, the persons X and Y are virtual persons having the same attribute. The person X is at a site outside the station from which the display 100a can be seen well; and the person Y is at a site close to the display 100a but the display 100a can be hardly seen therefrom because the site is inside of the station yard. In such a state, as the environmental information of the visible range, the data having a coefficient allowing the score to be lower than the score outside the station is given to the area in the station yard. Accordingly, the grid map obtained by incorporating the environmental information of the visible range into the expected moving range definition information of the person Y becomes the one with a low possibility in whole. Therefore, in the score calculation, the person Y shows a lower score than the person X. Note here that the expected moving range definition information of the person Y is in a form deformed along the ticket gate because of the presence of the ticket gates.

Examples of the environmental information include spatial environment data saying there is a wall, a ticket gate, or the like in the vicinity; and data such as time, weather, and season. In the second exemplary embodiment, for example, the environmental information can be visible range data composed of a coefficient allowing a high score in the vicinity of the front of the display and allowing a low score in the vicinity of the right beside the display within the visible range. Use of such data allows the person at a site from which an advertisement can be seen well to have a high score, and therefore the person who can see an advertisement well can be identified as an advertisement delivery target. The score calculation information database 26 may store advertisement delivery target information and the like in addition to the environmental information, and the information may be used at the time of calculating the score.

The score calculating means 13 calculates a score based on the relationship between the visible range of an advertisement and the calculated expected moving range of a person (step S30). Specifically, for example, the score can be calculated based on the size of an overlapped area of the obtained grid map and the visible range. Information relating to the visible range may be stored in the score calculation information database 26. In this case, the score calculating means 13 calculates a score by referring to the data (visible range data, size of an area in a grid map, attribute of a person, environmental information, and the like) stored in the score calculation information database 26.

The same effect as the first exemplary embodiment can be achieved also by the second exemplary embodiment. Further, since the score is calculated using the environmental information, the advertisement delivery target can be identified with higher accuracy.

(Calculation of Weighted Score)

The score calculating means 13 can also calculate a score by weighting according to a predetermined rule by referring to the data stored in the score calculation information database 26. For example, on the basis of the location information of a person, score addition can be performed across the board regardless of the attribute with respect to a person in the vicinity of the front of the display within a certain distance from the display. Also, on the basis of the attribute information of a person, with respect to all people excluding children not more than 15-year-old, score addition can be performed across the board regardless of the location information. Score calculation by weighting makes it possible to identify the advertisement delivery target with high accuracy.

Exemplary Embodiment 3

Figure 13:
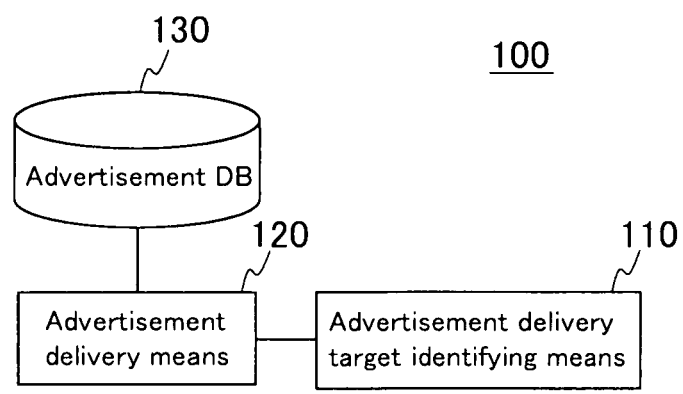
FIG. 13 is a block diagram showing the configuration of the advertisement delivery apparatus of a third exemplary embodiment of the present invention.
Figure 14:
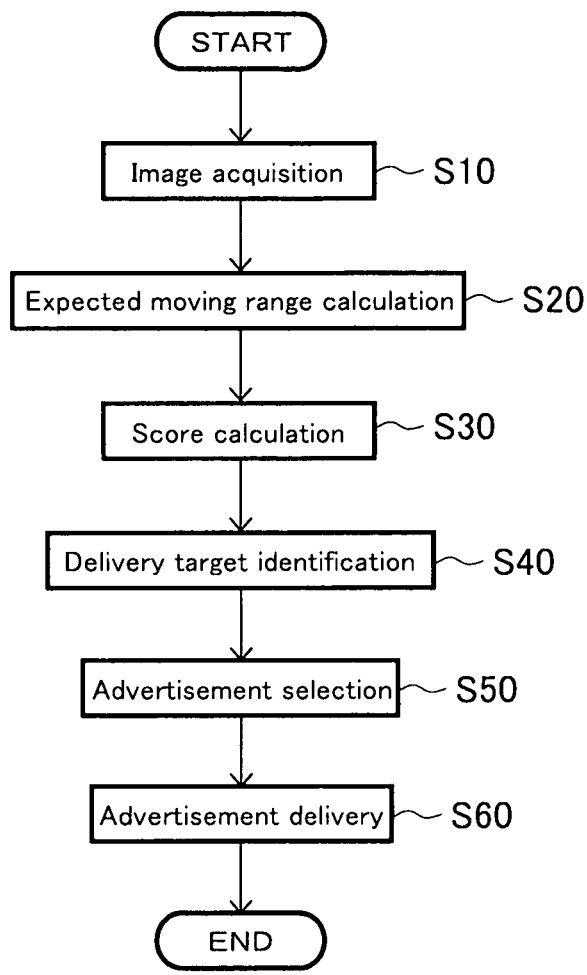
FIG. 14 is a flowchart showing the procedure performed by the advertisement delivery apparatus of the third exemplary embodiment.

FIG. 13 is a block diagram showing the configuration of an example of the advertisement delivery apparatus of the present invention. FIG. 14 is a flowchart showing the procedure performed by the advertisement delivery apparatus of a third exemplary embodiment. As shown in FIG. 13, an advertisement delivery apparatus 100 of the third exemplary embodiment includes advertisement delivery target identifying means (unit) 110, advertisement delivery means (unit) 120, and an advertisement database 130. The advertisement delivery target identifying means 110 is connected to the advertisement delivery means 120. The advertisement delivery means 120 is connected to the advertisement database 130.

The advertisement delivery target identifying means 110 of the third exemplary embodiment is the advertisement delivery target identifying apparatus of the first exemplary embodiment, and the advertisement delivery target identifying means 110 performs the procedure from the step S10 of acquiring image information of a person present within and outside of the visible range of an advertisement to the step S40 of identifying a person to be a target of an advertisement to be delivered (advertisement delivery target). Further, the advertisement delivery means 120 selects an advertisement to be delivered from the advertisement database 130 according to the attribute of the advertisement delivery target identified by the advertisement delivery target identifying means 110 (step S50) and delivers the advertisement (step S60). For example, if the advertisement delivery target identified is a male of 20s, an advertisement image of merchandise for young male is selected and displayed on an advertisement screen.

With respect to the advertisement delivery target identifying means 110, in the case where environmental information is taken into consideration, for example, if there is the environmental information of "cold", an advertisement for a hot beverage, thermal apparel, or the like suitable for the attribute of the identified advertisement delivery target can be delivered, and an advertisement effect can further be improved.

Exemplary Embodiment 4

The program of a fourth exemplary embodiment is a program that allows a computer to execute the advertisement delivery target identifying method or the advertisement delivery method. The program of the fourth exemplary embodiment may be recorded, for example, in a recording medium. There is no particular limitation on the recording medium, and examples of the recording medium include a random access memory (RAM), a read-only memory (ROM), a hard disk (HD), an optical disk, and a floppy (registered trade mark) disk (FD).

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-222361 filed on Sep. 30, 2010, the disclosure of which is incorporated herein in its entirety by reference.

INDUSTRIAL APPLICABILITY

According to the present invention, by identifying an appropriate person as an advertisement delivery target based on the relationship between the visible range of an advertisement and the expected moving range of a person, an advertisement effect can be improved. The advertisement delivery target identifying apparatus, the advertisement delivery apparatus, the advertisement delivery target identifying method, the advertisement delivery method, the program, and the recording medium of the present invention are effective not only in a case where an advertisement is delivered by a display or the like provided at a site where many people are gathered but also in a case where a delivery target is desired to be identified, and therefore can be applied to a wide range of fields.

EXPLANATION OF REFERENCE NUMERALS 10 and 20 advertisement delivery target identifying apparatus
11 image acquiring means
12 expected moving range calculating means
13 score calculating means
14 advertisement delivery target identifying means
15 attribute information database (DB)
16 and 26 score calculation information database (DB)
100 advertisement delivery apparatus
100a display
100b camera
110 advertisement delivery target identifying means
120 advertisement delivery means
130 advertisement database (advertisement DB)

The invention claimed is:

1. An advertisement delivery target identifying apparatus comprising:

an image acquiring unit, comprising one or more cameras or scanners, which acquires an image of a person present within or outside of a visible range of an advertisement;

an expected moving range calculating unit which calculates an expected moving range in a future of the person from the image;

a score calculating unit which calculates a score based on a relationship between the visible range of an advertisement and the calculated expected moving range; and an advertisement delivery target identifying unit which identifies the person to be a target of an advertisement to be delivered based on the calculated score, wherein the expected moving range calculating unit forms a grid map of the person, and the score calculating unit calculates the score based on the size of an overlapped area of the grid map of the person and the visible range.

2. The apparatus according to claim 1, wherein the expected moving range calculating unit calculates the expected moving range in the future based on location information of the person, traveling information of the person, and attribute information of the person.

3. The apparatus according to claim 1, wherein the score calculating unit calculates the score by taking environmental information of the visible range into consideration.

4. The apparatus according to claim 1, wherein the score calculating unit calculates the score by assigning weights to the person.

5. The apparatus according to claim 1, further comprising:
an advertisement delivery unit, wherein
the advertisement delivery unit selects an advertisement to be delivered according to an attribute of an advertisement delivery target identified by the advertisement delivery target identifying unit.

6. An advertisement delivery target identifying method comprising:
acquiring an image of a person present within or outside of a visible range of an advertisement;
calculating step of calculating an expected moving range in a future of the person from the image, and forming a grid map of the person based on the expected moving range;
calculating a score based on a size of an overlapped area of the grid map of the person and the visible range of the advertisement; and
identifying the person to be a target of an advertisement to be delivered based on the calculated score.

7. The method according to claim 6, wherein the expected moving range in the future is calculated based on location information of the person, traveling information of the person, and attribute information of the person.

8. The method according to claim 6, wherein the score is calculated by taking environmental information of the visible range into consideration.

9. The method according to claim 6, wherein the score is calculated by assigning weights to the person.

10. The advertisement delivery method according to claim 6, further comprising:
selecting an advertisement according to an attribute of an advertisement delivery target identified in the identifying step.

11. A non-transitory recording medium having recorded thereon a program executable by a computer for performing a method comprising:
acquiring an image of a person present within or outside of a visible range of an advertisement;
calculating an expected moving range in a future of the person from the image, and forming a grid map of the person based on the expected moving range;
calculating a score based on a size of an overlapped area of the grid map of the person and the visible range of the advertisement; and
identifying a person to be a target of an advertisement to be delivered based on the calculated score.

12. The non-transitory recording medium of claim 11, further comprising:
selecting an advertisement according to an attribute of an advertisement delivery target identified in the identifying step.

* * * * *

UNITED STATES PATENT AND TRADEMARK OFFICE
CERTIFICATE OF CORRECTION

PATENT NO. : 9,031,862 B2  
APPLICATION NO. : 13/824361  
DATED : May 12, 2015  
INVENTOR(S) : Hiyama et al.

Page 1 of 1

It is certified that error appears in the above-identified patent and that said Letters Patent is hereby corrected as shown below:

On the title page item [73],

Delete     "NEC Corporation  
                         Toyko (JP)"

and insert     -- NEC SOLUTION INNOVATORS, LTD.  
                         Tokyo (JP) --

In the specification

Column 6, Line 11: Delete "$[(X_{n-1}\ X_n)^2$" and insert -- $[(X_{n-1}-X_n)^2$ --

In the claims

Column 13, Line 22: Claim 6, before "calculating" delete "calculating step of"

Signed and Sealed this  
First Day of December, 2015

Michelle K. Lee  
*Director of the United States Patent and Trademark Office*